(12) United States Patent
Bauer

(10) Patent No.: US 10,711,922 B2
(45) Date of Patent: Jul. 14, 2020

(54) WALL FEED-THROUGH ELEMENT FOR A FLUID LINE AND WALL FEED-THROUGH

(71) Applicant: NORMA GERMANY GMBH, Maintal (DE)

(72) Inventor: Andreas Bauer, Obernburg (DE)

(73) Assignee: NORMA GERMANY GMBH, Maintal (DE)

( * ) Notice: Subject to any disclaimer, the term of this patent is extended or adjusted under 35 U.S.C. 154(b) by 1489 days.

(21) Appl. No.: 14/330,731

(22) Filed: Jul. 14, 2014

(65) Prior Publication Data

US 2015/0048613 A1    Feb. 19, 2015

(30) Foreign Application Priority Data

Aug. 13, 2013    (DE) .................. 10 2013 215 955

(51) Int. Cl.
| | |
|---|---|
| *F16L 5/00* | (2006.01) |
| *F16L 41/08* | (2006.01) |
| *F16L 37/00* | (2006.01) |
| *F16L 37/252* | (2006.01) |
| *F16L 5/02* | (2006.01) |

(52) U.S. Cl.
CPC ................ *F16L 5/00* (2013.01); *F16L 5/027* (2013.01); *F16L 37/008* (2013.01); *F16L 37/252* (2013.01); *F16L 41/088* (2013.01); *Y10T 29/49895* (2015.01)

(58) Field of Classification Search
CPC . F16L 5/00; F16L 5/027; F16L 37/008; F16L 41/008
USPC ................... 285/20, 189, 192–193
See application file for complete search history.

(56) References Cited

U.S. PATENT DOCUMENTS 255,523 A    2/1882    Lightburne
815,627 A    3/1906    Oldham
(Continued)

FOREIGN PATENT DOCUMENTS

DE    20 2008 005 929    9/2009
JP    02-030592    2/1990
(Continued)

OTHER PUBLICATIONS

Russia Decision to Grant a Patent for Invention conducted in counterpart Russia Appln. No. 2014123162/06 (dated Jan. 11, 2016) (w/ English language translation).
China Search Report conducted in counterpart China Appln. No. 201410373665.7 (dated Nov. 25, 2015) (w/ English language translation).
(Continued)

*Primary Examiner* — Anna M Momper
*Assistant Examiner* — Fannie C Kee
(74) *Attorney, Agent, or Firm* — Greenblum & Bernstein, P.L.C.

(57) ABSTRACT

Wall feed-through element for a fluid line that includes a housing having a feed-through region running in an axial direction with at least one attachment geometry and a stop. The feed-through region is structured with a bearing section and the connection geometry, on a side of the bearing section facing away from the stop at least one, includes at least one shaping protruding radially over the bearing section with a back wall facing the stop and at least one radially springable projection that is offset in a circumferential direction with respect to the shaping and extends toward the stop in an axial direction and beyond the back wall.

15 Claims, 1 Drawing Sheet

(56) References Cited

U.S. PATENT DOCUMENTS

| | | | | |
|---|---|---|---|---|
| 1,483,218 | A | * | 2/1924 | Fahnestock ............ H02G 3/083 16/109 |
| 2,954,248 | A | | 9/1960 | Brickman |
| 3,079,178 | A | | 2/1963 | Simpkins |
| 3,415,549 | A | | 12/1968 | Chatham |
| 3,468,565 | A | | 9/1969 | Roder |
| 3,811,650 | A | * | 5/1974 | Dehar ...................... F01P 11/02 184/1.5 |
| 4,762,343 | A | | 8/1988 | Hirohata |
| 5,422,437 | A | * | 6/1995 | Schnell ................ H02G 3/0691 174/153 R |
| 5,588,681 | A | | 12/1996 | Parks |
| 6,709,280 | B1 | | 3/2004 | Gretz |
| 6,780,029 | B1 | | 8/2004 | Gretz |
| 6,860,758 | B1 | | 3/2005 | Kiely |
| 7,064,272 | B2 | * | 6/2006 | Auray ....................... F16L 5/00 174/657 |
| 2004/0166708 | A1 | | 8/2004 | Kiely |
| 2006/0090794 | A1 | | 5/2006 | Shafik |
| 2006/0249952 | A1 | | 11/2006 | Topolsek et al. |
| 2011/0037252 | A1 | | 2/2011 | Brandt et al. |

FOREIGN PATENT DOCUMENTS

| | | |
|---|---|---|
| JP | 03-048191 | 5/1991 |
| JP | 1995-043578 | 10/1995 |
| JP | 1996-001355 | 1/1996 |
| JP | 10-160052 | 6/1998 |
| JP | 2004-019799 | 1/2004 |
| JP | 2006-292090 | 10/2006 |
| JP | 4278347 | 6/2009 |
| JP | 2010-065806 | 3/2010 |
| JP | 2010-127321 | 6/2010 |
| JP | 2010-281393 | 12/2010 |

OTHER PUBLICATIONS

Korean Search Report conducted in counterpart Korea Appln. No. 10-2014-0103356 (dated Sep. 1, 2015) (w/ English language translation).

German Office Action conducted in counterpart German Appln. No. 10 2013 215 955.2 (dated Mar. 30, 2017) (w/ partial English language translation).

European Search Report conducted in counterpart European Appln. No. 14 17 0162.3-1751 (dated Feb. 19, 2015).

* cited by examiner

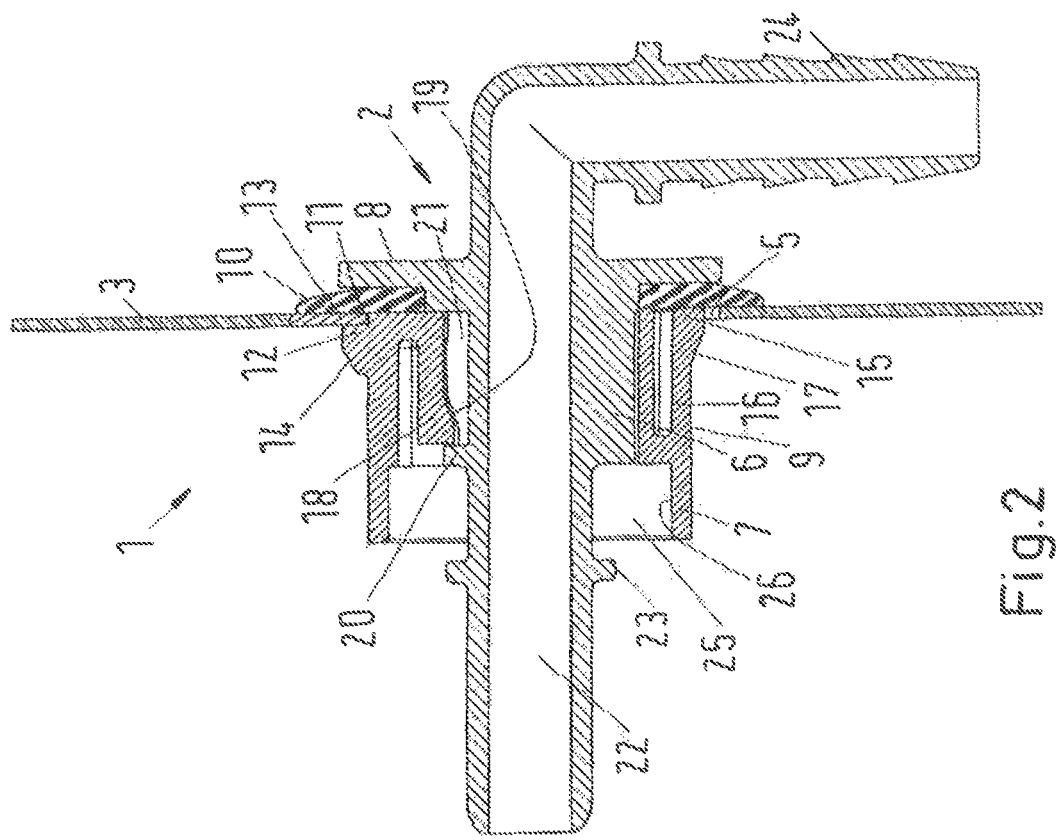
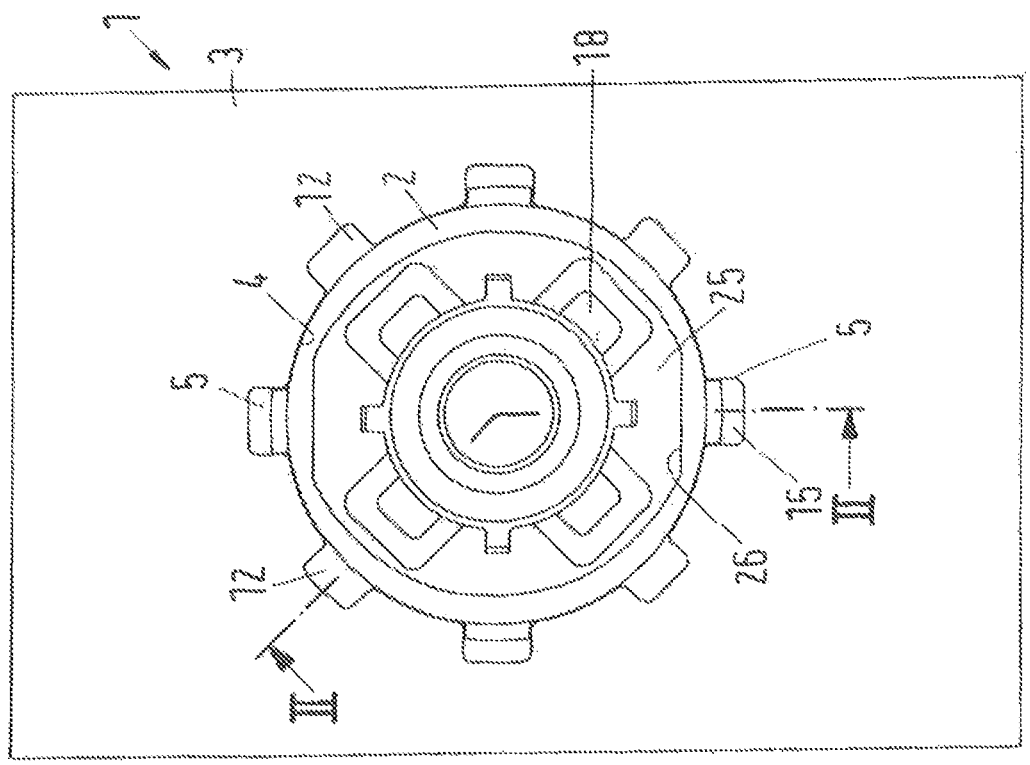

WALL FEED-THROUGH ELEMENT FOR A FLUID LINE AND WALL FEED-THROUGH

CROSS-REFERENCE TO RELATED APPLICATIONS

The present application claims priority under 35 U.S.C. § 119 of German Patent Application No. 10 2013 215 955.2, filed Aug. 13, 2013, the disclosure of which is expressly incorporated by reference herein in its entirety.

BACKGROUND OF THE INVENTION

1. Field of the Invention

Embodiments of the invention relate to a wall feed-through element for a fluid line with a housing that includes a feed-through region running in an axial direction with an attachment geometry and a stop. The feed-through region has a bearing section.

Furthermore, embodiments relate to a wall feed-through having a wall feed-through element of the above-described type and a wall having a pass-through opening.

2. Discussion of Background Information

In many cases, it is necessary to be able to feed a fluid through a wall. One example is a tank or a container from which fluid is to be extracted. For this purpose, a pass-through opening in the wall of the tank or the container is used. The wall feed-through element is fed through this pass-through opening with the feed-through region. In a known case, the feed-through region has an external thread as an attachment geometry. A nut is screwed onto this external thread and tightened until the stop bears against the wall on the other side of the wall. The region of the feed-through region between the nut and the stop, which is surrounded by the wall, is also referred to as the "bearing section", because the feed-through region is normally in contact with the wall here.

For the installation, a wall feed-through element of this type requires access from both sides of the wall. The access on the one side of the wall is necessary to be able to insert the wall feed-through element through the pass-through opening. The access on the other side of the wall is necessary to be able to screw the nut onto the external thread. The installation requires a relatively large amount of time.

SUMMARY OF THE EMBODIMENTS

Embodiments of the invention are directed to a wall feed-through that is easy to install.

Accordingly, a wall feed-through element of the type generally discussed above includes an attachment geometry having, on a side of the bearing section facing away from the stop, at least one shaping with a back wall facing the stop, in which the shaping protrudes radially over the bearing section, and at least one radially springable projection which is offset in a circumferential direction with respect to the shaping and protrudes towards the stop in an axial direction across from the back wall.

With a wall feed-through element of this type, the production of a wall feed-through element is simplified considerably. In particular, the wall feed-through element can be used by merely providing a bore in the wall in such a manner that the inner contour of the bore is matched to the outer contour of the attachment geometry in the region of the stop or the stops. In this case, it is possible to insert the wall feed-through element with the feed-through region through the pass-through opening in the wall. The shaping or the shapings can pass through corresponding regions at the circumference of the pass-through opening in the wall. The feed-through region is inserted far enough through the pass-through opening in the wall that the bearing section is located inside the wall. Because the shaping is located on the side of the bearing section facing away from the stop, the wall pass-through element can now be rotated in the pass-through opening so that the shaping reaches a region of the wall in which a movement of the wall feed-through element out of the pass-through opening, that is, opposite to the insertion direction, is no longer possible. A movement of this type is prevented in that the back wall strikes the wall. If the wall feed-through element is rotated far enough, then the springable projection reaches the region of the recess, through which the shaping has previously been fed. Here, the springable projection can spring radially outwards and enter the recess. This is possible because the projection protrudes towards the stop across from the back wall of the shaping and, thus, protrudes into the bearing section. Once the springable projection has engaged in the recess in the inner contour of the pass-through opening, a rotation of the wall feed-through element is no longer possible. Because a rotation is no longer possible, the wall feed-through element also cannot assume a position in which the shaping once again opposes a recess in the inner contour of the pass-through opening such that the wall feed-through element could be pulled out. Thus, the wall feed-through element can be mounted from one side of the wall, namely simply by way of a feed-through procedure which is followed by a rotation motion. An installation of this type can be carried out in a considerably shorter time than the screwing of a nut onto an external thread.

Preferably, multiple shapings are provided in a circumferential direction, in such a way that a springable projection is arranged between at least two shapings. If multiple shapings are provided, then a tilting of the wall feed-through element in the wall can be avoided. Here, it is advantageous if at least two, preferably three or four, shapings are provided which are, for example, distributed uniformly in a circumferential direction. Accordingly, the inner contour of the pass-through opening also has an equally large number of recesses.

Preferably, the bearing section has a circular cross section. This is particularly advantageous if the inner contour of the pass-through opening is, at least in section, likewise circularly embodied. In this case, the bearing section inside the pass-through opening can slide during a rotation motion. The bearing section can support the wall feed-through element in the pass-through opening.

Preferably, the projection has a deflector chamfer on its side facing away from the stop. When the wall feed-through element is inserted into the pass-through opening in the wall, then the deflector chamfer enables the springable projection to be pressed far enough radially inwards that it is completely accommodated in the pass-through opening. By way of the chamfer, the force for inserting the wall feed-through element into the pass-through opening of the wall is converted into a force acting radially on the springable projection.

Preferably, the projection extends radially at least as far as the shaping in an unloaded state. As a result, it is achieved with high reliability that the projection can spring radially outwards very far, and that it thus forms a relatively large resistance to a rotation of the wall feed-through element in the wall. The recess in the inner contour of the wall is normally only slightly larger than the radial extension of the shaping. Accordingly, it can be ensured that the projection, if it can spring radially outwards, virtually fills the recess in a radial direction.

Preferably, the housing has an inner part and an outer part, in which the inner part comprises a fluid channel and connection geometries for the fluid channel and the outer part comprises the attachment geometry. In this case, the design of the wall feed-through element is relatively flexible. In many cases, it is desirable, for example, to have different connection geometries available for the fluid channel. Different inner parts can then be used therefor. The outer part with the attachment geometry can, however, be kept the same for the different inner parts, so that the costs for tools can be kept low.

Preferably, the inner part and the outer part are connected to one another by a locking connection. This facilitates the installation. The inner part must simply be inserted into the outer part, so that parts of the locking connection engage in one another. In this way, tools or joining elements are not necessary.

Preferably, the inner part and the outer part are connected non-rotatably to one another. In many cases, it is desirable if the connection geometries of the fluid channel have a certain alignment. This alignment can be determined by the arrangement of the inner part in the outer part. Because the wall feed-through element is attached non-rotatably in the wall after installation is complete, as described above, the desired alignment of the connection geometries of the fluid channel can be secured by a non-rotatable connection between the inner part and the outer part.

Preferably, the stop is arranged on the inside part. This simplifies the construction. The tools for producing the inner part and outer part can thus also be constructed relatively simply, which reduces costs.

Embodiments of the invention are directed to a wall feed-through having a wall feed-through element, as it has been described above, and a wall which includes a pass-through opening that has an inner contour matched to the shaping.

As described above, a wall feed-through of this type can be produced relatively easily. This can be achieved with merely a pass-through opening having at least one recess in its inner contour for each shaping on the wall feed-through element. The wall feed-through element can then be inserted with its feed-through region into the pass-through opening. The shaping or the shapings then pass through the recess or the recesses, i.e., until they come free of the wall on the opposite side of the wall. If the wall feed-through element is rotated in the pass-through opening, the springable projection reaches the region of the recess and can then spring radially outwards so that a further rotation is prevented. In this manner, it is automatically prevented that the shaping or the shapings can once again be brought to overlap the recess or recesses.

Preferably, the inner contour, at least in sections, follows a circular line, so that the circular line has a diameter that is matched to a diameter of the bearing section. In this case, the bearing section can be rotated in the pass-through opening, so that the position of the wall feed-through element is virtually fixed. A displacement perpendicular to the feed-through region is virtually impossible. Only a rotation of the wall feed-through element relative to the wall is possible. The circular line is, of course, interrupted where recesses are provided, through which the shapings can pass.

Preferably, a seal is arranged between the stop and the wall. This seal has the task of sealing the wall in the region of the wall feed-through element. The seal is formed from an elastomer material. Accordingly, the seal also applies a certain spring effect and presses the stop away from the wall so that the back wall of the shaping is pulled against the side of the wall facing away from the stop. The wall feed-through element is thus held in the wall in the feed-through direction virtually without play.

Embodiments of the present invention are directed to a wall feed-through element for a fluid line that includes a housing having a feed-through region running in an axial direction with at least one attachment geometry and a stop. The feed-through region is structured with a bearing section and the connection geometry, on a side of the bearing section facing away from the stop at least one, includes at least one shaping protruding radially over the bearing section with a back wall facing the stop and at least one radially springable projection that is offset in a circumferential direction with respect to the shaping and extends toward the stop in an axial direction and beyond the back wall.

According to embodiments, the at least one shaping can include multiple shapings spaced in a circumferential direction and the at least one springable projection can be arranged between at least two shapings.

In accordance with other embodiments of the invention, the bearing section can have a circular cross section.

According to still other embodiments, the at least one projection may have a deflector chamfer on a side facing away from the stop.

In other embodiments, the at least one projection in an unloaded state can extend radially at least as far as the shaping.

In accordance with other embodiments, the housing may have an insertion opening surrounding a fluid channel opening. The insertion opening can have a torsional contact surface.

According to still other embodiments, the housing can include an inner part and an outer part. The inner part may include a fluid channel and connection geometries for the fluid channel and the outer part may include the at least one attachment geometry. The inner part and the outer part can be connected to one another by a locking connection. The inner part and the outer part may be non-rotatably connected to one another. The stop can be located on the inner part.

Embodiments of the invention are directed to a wall feed-through that includes the above-described wall feed-through element and a wall having a pass-through opening with an inner contour matched to the at least one shaping.

In embodiments, the inner contour, at least in sections, can follow a circular line. The circular line may have a diameter which is matched to a diameter of the bearing section.

According to other embodiments of the instant invention, a seal may be arranged between the stop and the wall.

In accordance with still other embodiments, the inner contour, at least in sections, can include at least one recess structured to correspond to the arrangement and shape of the shapings. The at least one shaping can be structured to pass through the wall while at least a part of the at least one projection is in contact with the inner contour. Further, the wall feed-through element, when the inner contour is axially aligned with the bearing region, may be rotatable until the at least one projection is springingly inserted into the at least one recess.

Embodiments of the invention are directed to a method of inserting a wall feed-through element through an opening in a wall. The method includes aligning shapings radially extending from an outer contour of the wall feed-through element with recesses extending from an inner contour of the opening in the wall, guiding an entirety of the shapings through the recesses so that the inner contour is axially aligned with a bearing surface of the wall feed-through element, and rotating the bearing surface relative to the inner contour until at least one projection arranged between at least two shaping is springingly engaged into at least one of the recesses.

According to embodiments, the wall feed-through element may include a seal and a stop and the method can further include pressing the seal via the stop against an inside surface of the wall as the inner contour is axially aligned with the bearing surface.

In accordance with still yet other embodiments of the present invention, as the shapings are being guided through the recesses, the at least one projection can be pressed radially inward by the inner contour.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a front-face view of a wall feed-through; and

FIG. 2 shows a cross section of II-II depicted in FIG. 1.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A wall feed-through 1 has a wall feed-through element 2, and a wall 3. Wall 3 is, for example, the wall of a container or a tank, from which a fluid is to be fed outwards.

Wall 3 is provided with a pass-through opening 4 for accommodating wall feed-through element 2. Pass-through opening 4 has as an inner contour essentially a circular line, from which, however, four recesses 5 extend radially outwards. In place of four recesses 5, a different number of recesses 5 can also be provided, for example 3, 4, 6, 7, or 8 recesses 5. Recesses 5 are distributed uniformly in a circumferential direction of pass-through opening 4. They have essentially a rectangular shape, but can also have the shape of a trapezoid.

Wall feed-through element 2 has a housing formed from an inner part 6 and an outer part 7. The housing has a stop 8, which in the present exemplary embodiment is arranged on inner part 6 and is embodied or formed in one piece with inner part 6. Furthermore, the housing, on outer part 7, has a feed-through region 9 with a connection geometry, which is explained in more detail below. For the installation of wall feed-through element 2, the housing is fed through pass-through opening 4 with feed-through region 9.

Between stop 8 and wall 3, a seal 10 is arranged which, in the present case, is formed as a sealing ring from an elastomer material.

Outer part 7 has a bearing section 11 which is arranged inside the pass-through opening 4 when the wall feed-through element 2 is installed. Bearing section 11 has essentially an outer contour in the shape of a circular line. The diameter of this outer contour is matched to the inner diameter of pass-through opening 4. A small play is permissible.

The housing has, distributed in a circumferential direction on outer part 7, multiple shapings 12 which can be embodied or formed as, e.g., approximately rectangular projections. Other forms are also possible without departing from the spirit and scope of the invention.

Each shaping 12 has a back wall 13 on its side facing the stop 8. Back wall 13 forms, as it were, a border of bearing section 11. In other words, shaping 12 is arranged on a side of bearing section 11 facing away from stop 8. In the present case, four shapings 12 are provided. The number of shapings 12 and the number of recesses 5 are equal.

Shapings 12 can have on their side facing away from the stop 8 a deflector chamfer 14.

Four projections 15 are arranged distributed in a circumferential direction between shapings 12. Each projection 15 is positioned at a tip of a web 16 that is connected to outer part 7. Web 16 forms a type of spring so that projections 15 are borne springably in a radial direction.

As can be recognized particularly in FIG. 2, projection 15 protrudes in an axial direction towards stop 8 across from back wall 13. Projection 15 also has a deflector chamfer 17 on the side facing away from stop 8.

Inner part 6 and outer part 7 are connected to one another via a locking connection. For this purpose, outer part 7 has in its interior a number of locking fingers 18 which are uniformly distributed in a circumferential direction. Each locking finger 18 has a deflector chamfer 19. When inner part 6 is inserted into outer part 7 (in relation to the illustration in FIG. 2, this movement of the inner part 6 with respect to the outer part 7 occurs from right to left), then locking finger 18 engages on inner part 6 behind a circumferential projection 20. For each locking finger 18, an accommodation chamber 21 is provided, in which accommodation chambers 21 have limiting walls in a circumferential direction. Accordingly, the engaged locking finger 18 prevents not only a movement in the insertion direction between inner part 6 and outer part 7, which is hereinafter also referred to as the "axial direction", but also prevents a rotation motion between inner part 6 and outer part 7.

Inner part 6 has a fluid channel 22. Furthermore, inner part 6 has connection geometries 23, 24 for each end of the fluid channel. The illustrated connection geometries 23, 24 are merely to be understood as examples and it is readily understood that other connection geometries can also be utilized without departing from the spirit and scope of the invention.

The installation of wall feed-through 2 is relatively simple. It can occur from one side of wall 3. This is, in relation to the illustration in FIG. 2, the right side in the present exemplary embodiment.

Wall feed-through element 2 is already provided with seal 10 prior to installation in wall 3. Seal 10 can be installed when inner part 6 and outer part 7 are assembled and engaged with one another.

Wall feed-through element 2 is fed through pass-through opening 4 with its feed-through region 9. Shapings 12 are oriented in order to pass through recesses 5 in the circumferential contour of pass-through opening 4. Of course, this can be achieved through a corresponding alignment of wall feed-through element 2 in relation to recesses 5.

While shapings 12 can pass through recesses 5 without difficulty, no corresponding passage is available for the projections 15. Thus, they are pressed radially inwards, for which purpose the deflector chamfer 17 is useful, and spring far enough radially inwards that they can also enter pass-through opening 4 outside recesses 5.

The insertion motion of wall feed-through element 2 into wall 3 is continued until seal 10 bears against wall 3 and is somewhat compressed by stop 8. Seal 10 is compressed far enough that shapings 12 come free from wall 3 with their back wall 13 or only bear against wall 3 with little tension on surface facing away from stop 8. In this state, a rotation of wall feed-through element 2 with respect to wall 3 is possible. In this rotation, bearing section 11 is borne by pass-through opening 4 so that only a rotation motion occurs, but no displacement parallel to wall 3.

The rotation motion of wall feed-through element 2 is continued until springable projections 15 can engage in recesses 5 of pass-through opening 4. Because projections 15 spring radially outwards, an engagement of this type is unproblematically possible and also audible for a fitter.

Once projections 15 are engaged in recesses 5, the installation is finished. Seal 10 can release and pull back wall 13 of shapings 12 against wall 3. Seal 10 thereby remains somewhat compressed so that it can adequately fulfill its sealing function.

The engaging of springable projections 15 in recesses 5 is possible because projections 15 protrude towards stop 8 over back wall 13 of shapings 12. Even if shapings 12 have completely passed through wall 3, springable projections 15 are still located in wall 3. A movement of projections 15 out of pass-through opening 4 is prevented by the interaction of stop 8 and seal 10.

As can be recognized in FIG. 1, shapings 12 and projections 15 protrude outwards roughly equally far in a radial direction.

Between inner part 6 and outer part 7, the housing has an insertion opening 25, into which a coupling element can be inserted in order to produce a connection between a fluid line (not illustrated) and fluid channel 22. In the present exemplary embodiment, insertion opening 25 has a torsional contact surface 26 which is embodied or formed, e.g., as a flattening of a circular shape. Of course, other torsional contact surfaces are also possible, e.g., a polygon. If a correspondingly matched coupling element is used, then the coupling element is kept non-rotatable with respect to wall feed-through element 2 so that not only a rotational position of wall feed-through element 2 with respect to wall 3 can be defined relatively accurately, but also an angle position of a line connected to wall feed-through element 2.

The embodiment of the housing with an inner part 6 and an outer part 7 has production-related advantages. The tools used to produce the housing, preferably injection-molding tools, can be kept relatively simple. However, it is also possible to embody or form the housing in one piece or to connect inner part 6 and outer part 7 to one another in a different manner, for example, by adhesion or welding.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A wall feed-through for a fluid line, comprising:
   a wall feed-through element comprising:
      a housing having a feed-through region running in an axial direction with at least one attachment geometry and a stop,
      wherein the feed-through region is structured with a bearing section,
      wherein the at least one attachment geometry, on a side of the bearing section facing away from the stop includes at least one shaping protruding radially over the bearing section with a back wall facing the stop and at least one radially springable projection that is offset in a circumferential direction with respect to the at least one shaping and extends toward the stop in an axial direction further than the back wall; a seal; and
   a wall having a pass-through opening with an inner contour matched to the at least one shaping,
   wherein the seal is positionable between the stop and the wall,
   wherein at least a part of the feed-through region is to be fed through the wall, and
   wherein the inner contour, at least partially, includes at least one recess extending radially outward and structured to correspond to an arrangement and shape of the at least one shaping.

2. The wall feed-through according to claim 1, wherein the at least one shaping comprises multiple shapings spaced in a circumferential direction and the at least one springable projection is arranged between at least two shapings.

3. The wall feed-through according to claim 1, wherein the bearing section has a circular cross section.

4. The wall feed-through according to claim 1, wherein the at least one projection has a deflector chamfer on a side facing away from the stop.

5. The wall feed-through element according to claim 1, wherein the at least one projection in an unloaded state extends radially at least as far as the at least one shaping.

6. The wall feed-through according to claim 1, wherein the housing has an insertion opening surrounding a fluid channel opening.

7. The wall feed-through according to claim 6, wherein the insertion opening has a torsional contact surface.

8. The wall feed-through according to claim 1, wherein the housing comprises an inner part and an outer part, wherein the inner part comprises a fluid channel and connection geometries for the fluid channel and the outer part comprises the at least one attachment geometry.

9. The wall feed-through according to claim 8, wherein the inner part and the outer part are connected to one another by a locking connection.

10. The wall feed-through according to claim 8, wherein the inner part and the outer part are non-rotatably connected to one another.

11. The wall feed-through according to claim 8, wherein the stop is located on the inner part.

12. The wall feed-through according to claim 1, wherein the inner contour, at least partially, follows a circular line, wherein the circular line has a diameter which is matched to a diameter of the bearing section.

13. The wall feed-through according to claim 1, wherein the seal is arranged between the stop and the wall.

14. The wall feed-through according to claim 1, wherein the at least one shaping is structured to pass through the wall while at least a part of the at least one projection is in contact with the inner contour.

15. The wall feed-through according to claim 14, wherein the wall feed-through element, when the inner contour is axially aligned with the bearing region, is rotatable until the at least one projection is springingly inserted into the at least one recess.

* * * * *